P. W. WEBSTER AND V. K. BOYNTON.
PROCESS OF PRODUCING INTERACTIONS BETWEEN GAS AND A LIQUID.
APPLICATION FILED NOV. 20, 1919.
1,361,940.
Patented Dec. 14, 1920.
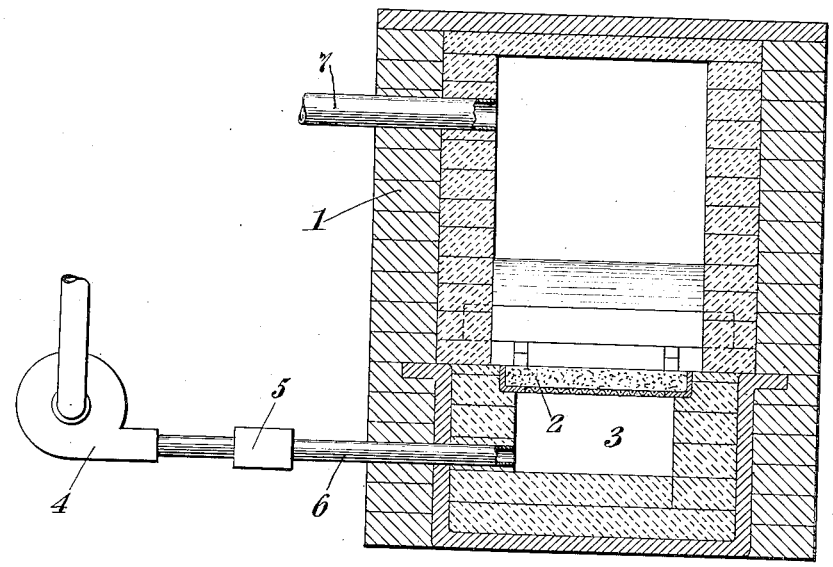
Paul W. Webster
Verne K. Boynton INVENTORS
BY
Prindle Wright & Small ATTORNEYS

UNITED STATES PATENT OFFICE.

PAUL W. WEBSTER, OF PELHAM MANOR, AND VERN K. BOYNTON, OF NEW YORK, N. Y., ASSIGNORS TO PERRY & WEBSTER INCORPORATED, OF ELIZABETH, NEW JERSEY, A CORPORATION OF NEW JERSEY.

PROCESS OF PRODUCING INTERACTIONS BETWEEN GAS AND A LIQUID.

1,361,940.   Specification of Letters Patent.   Patented Dec. 14, 1920.

Application filed November 20, 1919. Serial No. 339,427.

*To all whom it may concern:*

Be it known that we, PAUL W. WEBSTER, a citizen of the United States, and a resident of Pelham Manor, county of Westchester, and State of New York, and VERN K. BOYNTON, a citizen of the United States, residing at New York city, in the county of New York and State of New York, have invented a certain new and useful Process of Producing Interactions Between Gas and a Liquid, of which the following is a specification.

This invention has for its object to provide a process for producing interactions between a gas and a liquid which shall have, among other advantages, those of enabling a liquid to be concentrated, evaporated or dehydrated, or to be separated from another liquid or liquids, at comparatively low cost and high efficiency and with relatively low expenditure of heat, where heat is used, and without requiring that the said liquid shall be raised above its boiling point for the particular pressure used, and of enabling chemical reactions between a liquid or liquids and a gas or gases to be effected with unusual facility and efficiency, and in some cases, to effect such reactions, although they would not ordinarily take place between the same reagents, under the temperatures, concentrations, pressure or other conditions present in the practice of our process in such cases, and to such ends the invention consists in the process of producing interactions between a gas and a liquid hereinafter specified.

In the accompanying drawing, the single figure is a cross-sectional view of an apparatus adapted to be used to carry out the invention.

If a gas, insoluble or but slightly soluble in a liquid, be injected into the liquid through orifices of ordinary size, it is found that in passing through the liquid the bubbles first formed tend to merge or coalesce into bubbles of larger size, which latter form "pipes" of gas rising through the liquid at relatively high velocity. The surface contact between the gas and the liquid is small relatively to the volume of gas being passed through. Owing to the large size of the bubbles, the period of contact between the gas and the liquid is also relatively short. If the gas is supplied to the liquid in the form of bubbles sufficiently minute, they will not merge or form pipes, and, maintaining their identity, will rise through the liquid at a relatively low velocity, thus greatly increasing the time of contact between the gas and the liquid; and the surface contact for a given volume of gas will also be much greater than is obtained with bubbles of the larger size above mentioned. In the latter described condition, the gas might be termed "atomized", and an "emulsion" of the gas in the liquid might, for want of a better term, be said to exist. This condition may be produced, for instance, by passing gas under pressure through a porous medium or mass with interstices of relatively small size, such as the material known in the arts as filtros, and thence into the liquid. This material consists of a silicious material sintered and manufactured into porous blocks or plates.

We have found that, under these conditions, if the gas and liquid be suitably chosen, the gas will take up and carry off a certain proportion of the liquid or of one of its constituent parts. We have also found that the separated liquid can be carried off at a temperature below the boiling point of such liquid for the particular pressure present or below such boiling point of the liquid of which it formed a constituent.

If, now, the gas be heated before its entrance into the liquid, it exercises, to a remarkable extent, the function of absorbing and carrying off the liquid. Although the gas be heated much above the boiling point of the liquid being treated, the operation can be effected without raising the temperature of the liquid itself to its boiling point. Under the said conditions, it is found that the interaction between the gas and the liquid is much increased and results, such as chemical reactions, can be accomplished which seem contrary to all previous experience.

Our process is capable of being practised with many different forms of apparatus and of being applied to many different purposes and materials. We shall give several different examples of the application of the process, but it is to be understood that they are to be regarded only as typical of many possible applications thereof, and the invention is not at all to be confined thereto.

The first example of our process which we shall give is its application to the recovery of sludge acid, which is an impure acid that remains after the treatment of mineral oils and their products with sulfuric acid. It has been found a difficult matter to concentrate and purify such acid for re-use, on account of the carbon compounds which it contains and which are usually in the form of tarry materials, difficult to separate from the acid. Furthermore, the concentration of such acid is likely to be attended by the formation of sulfur compounds due to the evaporation of a portion of the acid or the reduction of the sulfuric acid by unseparated hydro-carbons when the acid is heated, with consequent loss of acid and giving off of objectionable gases from the apparatus.

Apparatus for the recovery of sludge acid is shown in the accompanying drawing. A receptacle 1, the walls of which may be formed of suitable acid-resisting brick, is provided with a member 2 having pores or orifices therein of such minute size that bubbles of the desired character will form when the gas is passed therethrough. This member 2 is preferably made of an acid-resisting porous material, which is electrically nonconducting; such, for instance, as the product known as filtros, which has before been mentioned herein. In the present construction, this porous member forms the bottom of the receptacle 1, and a chamber 3 is provided beneath the receptacle to contain heated gas under pressure, a suitable blower 4 being provided for forcing air through a heater 5 and thence through a pipe 6 into the said chamber.

In the treatment of the acid by the said apparatus, the receptacle is supplied with the sludge acid to be treated, and the heated gas or air from the chamber passes through the porous member or diaphragm 2. The receptacle is preferably so formed that the porous diaphragm will underlie substantially the whole of the body of the sludge acid contained within the receptacle, so that the gas will rise through every part of the body of the liquid. The air is preferably heated to a temperature in the neighborhood of 1000° F. and compressed in the chamber to a pressure of 2 lbs. per square inch. By being filtered through the interstices of the diaphragm 2, the gas enters the sludge acid in the form of minute bubbles, enveloped and separated from each other by the liquid, an "emulsified" or "atomized" condition, so to speak, being brought about, and is in such a condition as to rise therein only relatively slowly through the acid. Thus, a very large superficial area of the gas is exposed to the liquid for a given volume of gas, and the time of exposure is relatively long and therefore conducive to a complete interaction. By the above interaction the acid may be concentrated to the desired strength by carrying off water therefrom with the gas which passes through the liquid. Moreover, although the gas be initially heated to a temperature far above the boiling point of the sulfuric acid, say, to 1000° F., the temperature of the sludge acid will not rise to the boiling point of the acid, but only to a substantially lower temperature. This is a remarkable result, for sulfuric acid, when concentrated according to the ordinary processes, will not part with its water to any appreciable extent unless the acid be heated to or above its boiling point, but, on the other hand, is deliquescent, and even in a quiescent state, with only surface exposure, will remove water from gas in contact with that surface. Thus, our process accomplishes the concentration of sulfuric acid at temperatures where the removal of the water cannot be attributed to vaporization or dissociation by heat alone. This ability to concentrate the sulfuric acid at a temperature appreciably below its boiling point has the great advantage of avoiding raising the sulfuric acid to temperatures which are destructive of the acid and which produce marked distillations or dissociations or chemical changes therein, such as the evolution of sulfurous and sulfuric anhydrids. It also results in a marked reduction in the sensible heat required to be supplied to the acid by other methods, which are carried on at normal pressures and at the boiling point of the liquids since the temperature of the acid does not have to be raised to its boiling point. The quantity of gas required is relatively very low, due to the abnormal water absorption and carrying power of the gas when used under these conditions. These advantages, due to ability to treat the liquid at a temperature below its boiling point of course apply to the treatment of many other liquids than sulfuric acid.

Further, in the ordinary processes for the treatment of sludge sulfuric acid, the unseparated hydro-carbons contained therein progressively accumulate in the acid as semi-liquid, tarry masses. But when such acid is treated by our process, such compounds are largely and markedly oxidized over into saturated hydro-carbons, both volatile and gaseous, and the volatile derivatives, together with a portion of the water present and undissolved gases, such as are frequently present in sludge and spent acids, are evaporated and pass off from the surface of the acid with the gaseous products as vapors. This oxidation also results in the formation of a residue of solid carbonaceous material usually in granular form, easily and cheaply removable from the acid, which might be accounted for at least in part by reaction with an extra loading in the atomized gas of oxygen dissociated from the water which in turn has been passed into the gas globules from the acid. Oxygen in its nascent form is most efficient for the oxidation of the unsaturated volatile hydro-carbons. Furthermore, as would be the case in certain other reactions, a certain amount of heat is generated when the gas reacts with the unsaturated hydrocarbon compounds contained within the sludge acid, which heat energy may be transferred to the minute bodies of gas to raise their temperature, and thus enable the gas to react more efficiently upon the liquid.

As another example of the application of our process: sulfuric acid having a concentration of 40° Be. will concentrate to acid having, for instance, 64° Be. strength, with a gradual rise in temperature of the emulsified acid up to a maximum of about 249° F., although the boiling point of sulfuric acid, at the latter strength, is about 451° F. and although gas such as that derived from the burning of fuel oil be used, and at a temperature in the neighborhood of 1200 to 1400° F.

Again, water can be rapidly evaporated at atmospheric pressure either from a body of water or from solutions, at temperatures below the boiling point of water at atmospheric pressure, by passing preheated air therethrough in the above described emulsified condition. Ordinarily, to evaporate liquids efficiently at relatively low temperatures, it has been the practice to carry on the operation in a vacuum, requiring expensive apparatus.

It will be seen that our process possesses advantages of great importance. It enables a liquid to be concentrated, evaporated or dehydrated at comparatively low cost; with the use of a comparatively small volume of gas; with a relatively low expenditure of heat, where heat is used, and in many instances without requiring that the liquid shall be raised to its boiling point for the particular pressure used. Our process also enables chemical reactions between gases and liquids to be effected with unusual intensity and often under circumstances where such reactions would not otherwise be possible.

Gas, when previously heated and forced through the porous medium, seems to have its properties theretofore possessed enhanced and also possibly to have properties developed in it not theretofore recognizably possessed. It seems to have reactive or interactive forces not heretofore known to be due to heat alone or to moderately fine subdivision alone. Thus, we have found that the atomized gas, when emulsified into a liquid according to our process, has an enhanced coefficient of moisture absorption and power to remove water from the liquid for any given volume, pressure and temperature.

We are unable to state with certainty the theory of the various actions taking place in our process, but we advance the following possible explanations without committing ourselves to the correctness thereof, because they serve to emphasize and give occasion to elucidate the phenomena connected with the interaction of the gas and liquids under the conditions of our process.

In our use of the porous or atomizing medium, gas under pressure is forced through minute and intercommunicating tortuous interstices, causing separation of the original volume of gas into many diametrically minute streams, with resulting friction and impacts, and which streams, at the point of entrance into the liquid, are successively cut off by the enveloping liquid into minute globules, so that a condition results which as before stated is comparable to the condition of an emulsified liquid. Furthermore, there is a conversion of force incident to the separating of the single volume of liquid into very many minute single globules of liquid and there is an important conversion of force into charges of electricity present in each minute single globule of liquid, and which consequently may be repellent to each other. It seems probable that the atomizing of the gas in our process may be accompanied by partial conversion of the original forces of heat and pressure, and the resulting friction and impact, over into electrical charges in the atomized bubbles of gas, and also by dissociation of some or all of the water contained in the gas into the component parts of the water, namely, hydrogen and oxygen, and that the bubbles become mutually repellent. There are phenomena observable in the process which might be accounted for, at least in part, by such force conversions. It is conceivable that the stimulation in the chemical activity of the small bodies of gas which come into contact with the liquid might be accounted for in case ionization takes place. This would explain the remarkable chemical action of the gas upon the hydro-carbons in the sludge acid treatment whereby such compounds are oxidized or changed over into volatile derivatives carried off by the gas, whereby only granular carbon remains to be removed from the sulfuric acid after the treatment has been completed. Ionization, or creation of static charges in the minute gaseous bodies, might also explain to some extent the unexpected action of the gas in removing water from sulfuric acid or evaporating other liquids, at temperatures and under conditions which would not be expected to permit such interactions to be efficiently carried on.

In case ionization, or static charges, are produced in the gas, it would be desirable to lead the gas through the atomizing medium at a sufficiently high temperature, or with sufficient heat energy, to permit the conversion of such energy into electrical energy in the form of static charges, whereby the chemical activity of the gas may be substantially stimulated by ionization at the time the gas comes into contact with the liquid to be treated. It would also be desirable to use an electrically insulating atomizing medium in order to permit the static charges to be produced within the minute gaseous bodies.

The increased ability of air or fuel gas to remove water from sulfuric acid when used according to our process may also be, at least in part, due to the following reasons:

In the example of concentrating sulfuric acid above given, for instance, the atomized gas first meets or enters the liquid, as before stated, in the shape of an immense number of very minute bubbles of gas, which have been heated to above 450° F., and which therefore have an exceedingly high coefficient of moisture-absorption and power to remove water from the acid, when compared with their coefficient at the temperature of the acid; in other words, at temperatures below 250° F. Due to the emulsification resulting from the atomization of the gas, the minute bubbles of gas are inhibited from their usual tendency to coalesce into larger bubbles or pipes of gas, and thus also present at the immediate time of entrance into the acid an aggregate of comparatively immense surface of hot gas to the enveloping surface of acid. The entrance of the water in the form of gas into a minute bubble, and its attendant conversion from a liquid to the gaseous state, is accompanied by heat absorption with the expectancy of recondensation of all or a portion of the water vapor back into liquid form as the minute bubble approximates the comparatively low temperature of the body of sulfuric acid; but because of the emulsified form of the gas and the inhibition of the tendency of the bubble, thus containing recondensed water, to unite with other bubbles and to cause a break in the surface tension of the liquid surrounding the bubble, the water thus recondensed would not escape from the bubble, and it is conceivable that the bubble will rise through the liquid sulfuric acid and escape from its surface, carrying its above-described charge of water in the condition of minute particles of comparatively cold fog in a colloidal state. Thus we conceive that the minute bubbles of gas have taken into themselves as water vapor at temperatures above 450° F., a weight of water which they could not otherwise have taken and which they are thus able to carry up through and out of the liquid sulfuric acid as minute enveloped mists of fog.

If the bubbles of gas have electric charges, the colloidal fog condition would be thereby promoted and maintained, and in such minute unit volumes it is conceivable that the force represented by the chemical affinity of the acid for the water within the bubble would not be sufficient to overcome the surface tension of the enveloping liquid in the surface of the bubble. While the theories of static condition of the bubbles of gas, and also the theory to explain the great enhancement of the water-removing power of the bubbles, and the hypothesis of the resultant fog within the gas bubbles seem probable to us, yet any or all of these theories may be wrong without affecting the facts of actual operation of our process. We do not vouch for their correctness, but, as before stated, have advanced these theories because they seem to explain and serve to emphasize and elucidate the phenomena and the details of the behavior of the gas and liquids interacting under the conditions of our process.

As before stated, we have used the expression "atomized" in a somewhat arbitrary sense, to indicate, as far as we can with our present knowledge, the peculiar physical condition and possibly those peculiar reactive properties, both of the gas units with relation to one another and with relation to the liquid with which they are in contact, due to such treatment as that to which they have been subjected in accordance with the foregoing description.

Anticipating that criticism of the phraseology employed may be made upon the ground that the extent or completeness of subdivision is stated in terms which might seem to imply only a difference in degree, we state that whatever may be the cause of the phenomena, there seems to be something in the nature of a critical point in progressive subdivision, at which the tendency of the gas units to coalesce with one another and pass upward practically undergoes a marked and substantive change resulting in a condition of extreme diffusion which we have attempted to describe above as comparable to an emulsion of two liquids.

Although for a clear understanding of our process we have stated to the best of our ability certain phenomena, they may not comprise everything concerned therewith or taking place therein. Furthermore, in using the expressions "insoluble" or only "partly soluble" with reference to the relation between the gas and the liquid or liquids, we do not mean to imply that the gas is necessarily inert toward the liquid or liquids, since we contemplate the possibility of interaction and consequent modification of the original condition of the gas or liquid or both. For conciseness we use the expression "substantially insoluble" with reference to the gas as indicative of the characteristics above described.

While the examples which we have given took place at atmospheric pressure on the surface of the liquid and many other applications would be probable at that pressure, it is to be understood that our process can be practised under greater or less pressure than atmospheric pressure and some or all of the advantages obtained which we have enumerated without requiring that the temperature of the liquid or liquids be raised to their boiling points at the particular pressure used.

I claim:

1. The process of removing a portion of a body of liquid, which comprises passing into the liquid a gas in such finely divided state as to avoid coalescence of the minute bodies of the gas.

2. The process of evaporating a liquid, which comprises passing into the liquid a gas in such finely divided state as to avoid coalescence of the minute bodies of gas.

3. The process of removing a portion of a body of liquid, which comprises passing through the liquid a gas in such finely divided state as to avoid coalescence of the minute bodies of the gas, and carrying off such portion of the liquid with gas which has passed through the liquid.

4. The process of removing a portion of a body of liquid, which comprises passing into the liquid a gas in such finely divided state as to avoid coalescence of the minute bodies of the gas, the gas being heated to a temperature above the temperature of the liquid.

5. The process of removing a portion of a body of liquid, which comprises passing into the liquid a gas in such finely divided state as to avoid coalescence of the minute bodies of the gas, the gas being initially heated to a temperature above the temperature of the liquid.

6. The process of evaporating water, which comprises passing thereinto a gas in such finely divided state as to avoid coalescence of the minute bodies of the gas, the gas being initially heated to a temperature above the temperature of the water.

7. The process of removing a portion of a body of liquid, which comprises passing through the liquid a gas in such finely divided state as to avoid coalescence of the minute bodies of the gas, and carrying off such portion of the liquid with the gas which has passed through the liquid, the gas being initially heated to a temperature above the temperature of the liquid.

8. The process of removing a portion of a body of liquid, which comprises passing into the liquid a gas in such finely divided state as to avoid coalescence of the minute bodies of the gas, the gas being initially heated to a temperature in excess of the boiling point of the liquid, and the liquid maintained at a temperature below the boiling point.

9. The process of removing a portion of a body of liquid, which comprises passing through the liquid a gas in such finely divided state as to avoid coalescence of the minute bodies of the gas, and carrying off such portion of the liquid with the gas which has passed through the liquid, the gas being initially heated to a temperature in excess of the boiling point of the liquid, and the liquid maintained at a temperature below the boiling point.

10. The process of concentrating sulfuric acid, which comprises passing therethrough, a gas in such finely divided condition as to avoid coalescence of the minute bodies of gas.

11. The process of concentrating sulfuric acid, which comprises passing therethrough, a heated gas in such finely divided state as to avoid coalescence of the minute bodies of the gas.

12. The process of concentrating sulfuric acid, which comprises forcing air heated to a temperature in the neighborhood of 1000° F. through the acid to be concentrated, while maintaining the acid at a temperature below its boiling point.

13. The process of concentrating sulfuric acid, which comprises forcing air heated to a temperature in the neighborhood of 1000° F. through the acid to be concentrated, and in such finely divided condition as to avoid coalescence of the minute gaseous bodies, while maintaining the acid at a temperature below its boiling point.

14. The process of purifying sludge acid, which comprises passing thereinto, a gas heated to a temperature in excess of the boiling point of the acid, and in such finely divided condition as to avoid coalescence of the minute bodies of gas, while maintaining the acid at a temperature below its boiling point, and carrying off gaseous products of the interaction with gas which has passed through the acid.

15. The process of removing a portion of a body of liquid, which comprises passing a gas into the liquid through a porous member having so fine openings as to bring the gas into contact with the liquid in such finely divided condition as to avoid coalescence of the minute gaseous bodies.

16. The process of removing a portion of a body of liquid, which comprises passing into contact with the liquid an ionized gas in such finely divided condition as to avoid coalescence of the minute bodies of gas.

17. The process of removing a portion of a body of liquid which comprises passing into contact with the liquid, an ionized gas in such finely divided condition as to avoid coalescence of the minute bodies of gas, the gas being heated to a temperature substantially above the temperature of the liquid.

18. The process of removing a portion of a body of liquid, which comprises passing a heated gas into the liquid through a porous member of insulating material having so fine openings as to bring the gas into contact with the liquid in such finely divided condition as to avoid coalescence of the minute gaseous bodies.

19. The process of effecting a chemical reaction by treating a liquid with a gas, which comprises passing the gas into the liquid through a member having so small openings therein as to bring the gas into contact with the liquid in such finely divided state as to avoid coalescence between the minute gaseous bodies, the gas being initially heated to a temperature sufficient to impart a substantial amount of heat energy thereto.

20. The process of effecting a chemical reaction by treating a liquid with a gas, which comprises passing the gas into the liquid through a member having so small openings therein as to bring the gas into contact with the liquid in such finely divided condition as to avoid coalescence between the minute gaseous bodies, the gas being brought into contact with the liquid in an ionized state.

21. The process of effecting a chemical reaction by treating a liquid with a gas, which comprises passing the gas into the liquid through a member having so small openings therein as to bring the gas into contact with the liquid in such finely divided state as to avoid coalescence between the minute gaseous bodies, the gas being initially heated to a temperature sufficient to impart a substantial amount of heat energy thereto, and carrying off products of the reaction with the gas which passes through the liquid.

22. The process of effecting a chemical reaction by treating a liquid with a gas, which comprises passing the gas into the liquid through a member having so small openings therein as to bring the gas into contact with the liquid in such finely divided state as to avoid coalescence between the minute gaseous bodies, the gas being brought into contact with the liquid in an ionized state, the gas being initially heated to a temperature sufficient to impart a substantial amount of heat energy thereto, and carrying off products of the reaction with the gas which passes through the liquid.

23. The process of effecting a chemical reaction by treating a liquid with a gas, which comprises passing a gas reactive with a portion of the liquid, into such liquid through a porous block of insulating material having so small openings therein as to bring the gas into contact with the liquid in such finely divided state as to avoid coalescence between the minute gaseous bodies, the gas being initially heated to a temperature sufficient to impart a substantial amount of heat energy thereto.

24. The process of purifying sludge acid which comprises passing thereinto, a gas heated to a temperature substantially above the boiling point of the acid and in such finely divided condition as to avoid coalescence of the minute bodies of gas, reacting chemically upon the hydro-carbons contained in the acid to oxidize or volatilize the same, and carrying off products of the reaction and interaction with gas which has passed through the acid.

25. The process of effecting a chemical reaction by treating a liquid with a gas, which comprises passing through the liquid, a gas not readily soluble therein, and in such finely divided condition as to avoid coalescence of the minute bodies of gas, the gas being heated to a temperature substantially above that of the liquid.

26. The process of effecting a chemical reaction by treating a liquid with a gas, which comprises passing a gas reactive with a liquid into the liquid in such finely divided condition as to avoid coalescence of the minute gaseous bodies, and heating the minute gaseous bodies by the chemical reaction with the liquid.

27. The process of effecting a chemical reaction by treating a liquid with a gas, which comprises passing a gas reactive with a liquid into the liquid in such finely divided condition as to avoid coalescence of the minute gaseous bodies, and heating the minute gaseous bodies by the chemical reaction with the liquid, the gas being initially heated to a temperature above that of the liquid.

In testimony that we claim the foregoing. we have hereunto set our hands this 19th day of November, 1919.

PAUL W. WEBSTER.
VERN K. BOYNTON.